United States Patent [19]

Inaba et al.

[11] Patent Number: 5,723,065
[45] Date of Patent: Mar. 3, 1998

[54] LIQUID CRYSTAL COMPOSITIONS AND LIQUID CRYSTAL DISPLAY DEVICES

[75] Inventors: Shinichi Inaba; Tsutomu Mikajiri, both of Ichihara, Japan

[73] Assignee: Chisso Corporation, Osaka, Japan

[21] Appl. No.: 178,809

[22] Filed: Jan. 7, 1994

[30] Foreign Application Priority Data

| Jan. 11, 1993 | [JP] | Japan | 5-017838 |
| Jun. 8, 1993 | [JP] | Japan | 5-163274 |

[51] Int. Cl.⁶ .................... C09K 19/52; C09K 19/54; G02F 1/13
[52] U.S. Cl. .................... 252/299.01; 252/299.2; 252/299.3; 252/299.4; 252/299.5; 349/186
[58] Field of Search .................... 252/299.01, 299.5, 252/299.3, 299.2, 299.4; 349/186

[56] References Cited

U.S. PATENT DOCUMENTS

| 3,951,845 | 4/1976 | Cole, Jr. | 252/299.4 |
| 3,966,631 | 6/1976 | Toriyama et al. | 252/299.4 |
| 4,366,080 | 12/1982 | Mizunoya et al. | 252/299.3 |
| 4,640,795 | 2/1987 | Ogawa et al. | 252/299.5 |
| 4,864,008 | 9/1989 | Marata et al. | 528/125 |
| 5,067,797 | 11/1991 | Yokokura et al. | 428/1 |
| 5,122,296 | 6/1992 | Johten et al. | 252/299.5 |

FOREIGN PATENT DOCUMENTS

| 0160175 | 4/1984 | European Pat. Off. . |
| 0385688 | 9/1990 | European Pat. Off. . |
| 0442499 | 8/1991 | European Pat. Off. . |
| 0451821 | 10/1991 | European Pat. Off. . |
| 2727024 | 12/1978 | Germany . |

*Primary Examiner*—Shean C. Wu
*Attorney, Agent, or Firm*—Wenderoth, Lind & Ponack

[57] ABSTRACT

A liquid crystal composition for a liquid crystal display device of supertwisted nematic mode characterized in that it comprises at least one compound selected from the group consisting of condensed heterocyclic compounds, aromatic amine compounds, aliphatic amine compounds and aromatic hydroxy compounds. Liquid crystal display devices having high quality such that no irregular display caused by dust and fusion phenomena are observed can be provided by using the liquid crystal compositions by controlling to scarcely lower the specific resistance value and to lower the voltage-holding ratio.

10 Claims, 2 Drawing Sheets

LIQUID CRYSTAL COMPOSITIONS AND LIQUID CRYSTAL DISPLAY DEVICES

BACKGROUND OF THE INVENTION

The present invention relates to liquid crystal compositions for liquid crystal display devices and to liquid crystal display devices using the compositions. More particularly, it relates to nematic liquid crystal compositions for liquid crystal display devices of supertwisted nematic (STN) mode and to liquid crystal display devices using the compositions. Compact and thin display devices exhibiting little electric power consumption and yet having similar display capacity and quality to those of conventional cathode ray tube (CRT) are required with the latest development of information instruments, particularly personal terminal equipments. For this reason, a liquid crystal display method using supertwisted nematic (STN) mode is widely adopted at present. The mode was proposed by T. J. Scheffer et al in 1984, which was epochmaking because the mode exceeded the limit of twisted nematic (TN) mode used for conventional liquid crystal displays. Namely, they reported that better contrast and broader viewing angles than those of the TN mode having a twist angle of 90 degrees were obtained by establishing the twist angle at 180–270 degrees to use birefringence effect of a liquid crystal cell, and that, even if the duty ratio was decreased (~1/480), the display quality was not so lowered. (For example, refer to T. J. Scheffer et al: Appl. Phys. Lett., 45 (1984) 1021.)

However, though the STN mode has distinctive features of a distinct contrast and a broad viewing angle, there remain problems of low production yield due to abnormal lighting of liquid crystal cells caused by static electricity, irregular display caused by foreign substances contained in display materials during the production process such as for panel assembly, or poor display by fusion of the display surface caused by long time lighting. To resolve these problems, a method for controlling the electric property of the liquid crystal composition is exemplified. As to the abnormal lighting caused by static electricity, it was reported to control specific resistance value by adding an ionic compound such as quaternary ammonium salt to a liquid crystal composition having great specific resistance value. (For example, refer to Japanese Patent Application Laid-open Number 59-4647.) However, the ionic compound shows insufficient compatibility and solubility characteristics to conventional liquid crystal compositions. Some problems still remain. Namely, it is difficult to homogeneously disperse the ionic compound in a liquid crystal cell because the compound is easily adsorbed in the neighborhood of an injection part. Since it is necessary at the same time to control the specific resistance value and to lower the voltage-holding ratio, the consumption of electric power of the liquid crystal cell very often becomes greater.

SUMMARY OF THE INVENTION

An object of the present invention is to provide liquid crystal display devices of STN mode, which do not show poor display such as irregular display or fusion phenomena. To realize the obtention of such devices, another object of the present invention is to provide stable liquid crystal compositions by controlling to scarcely lower the specific resistance value and to lower the voltage-holding ratio and electric power consumption.

The present invention is based on the conception that the specific resistance value is scarcely lowered and the voltage-holding ratio is easily controlled by adding a very small amount of at least one compound selected from the group consisting of condensed heterocyclic compounds, aromatic amine compounds, aliphatic amine compounds, and aromatic hydroxy compounds that are nonionic compounds to liquid crystal compositions.

Namely, the first feature of the present invention is a liquid crystal composition for a liquid crystal display device of supertwisted nematic mode which comprises at least one compound selected from the group consisting of condensed heterocyclic compounds, aromatic amine compounds, aliphatic amine compounds, and aromatic hydroxy compounds. The second feature of the present invention is a liquid crystal display device of supertwisted nematic mode characterized in that the liquid crystal composition is used. The third feature of the present invention is a method for controlling the voltage-holding ratio of the liquid crystal composition for the display device of supertwisted nematic mode by adding to the composition at least one compound selected from the group consisting of condensed heterocyclic compounds, aromatic amine compounds, aliphatic amine compounds, and aromatic hydroxy compounds.

DETAILED DESCRIPTION OF THE INVENTION

Figure 1:
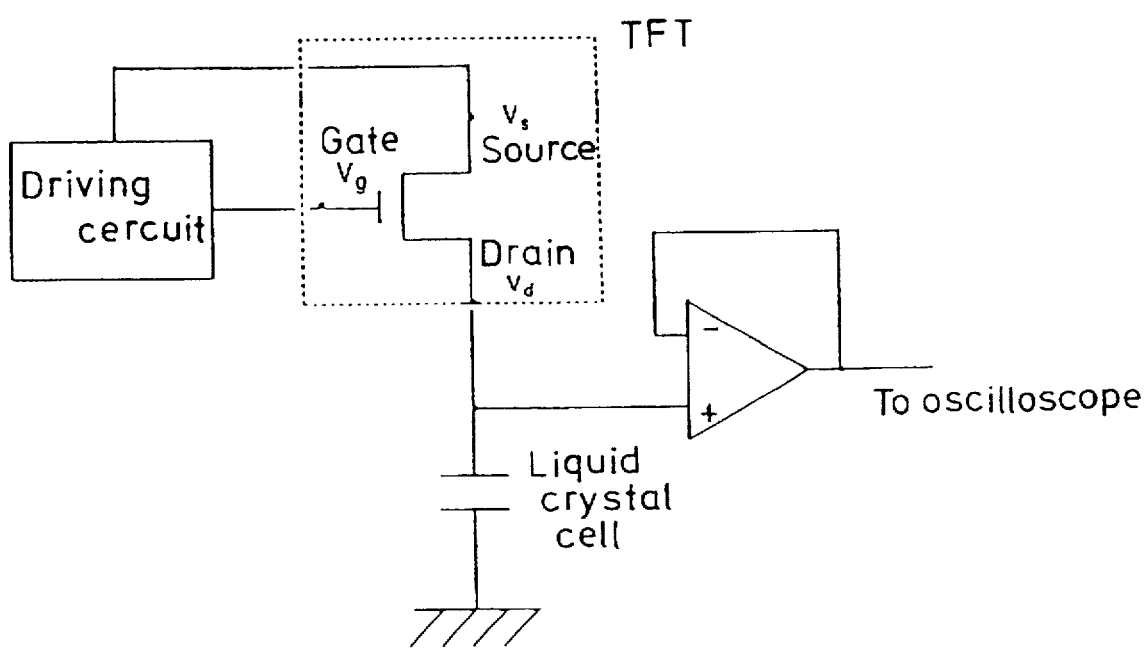
FIG. 1 shows a measuring circuit of voltage-holding ratios.

The present invention is fully described in the following. The voltage-holding ratio and the specific resistance value of the liquid crystal compositions depend on the purity of the compositions. Since a liquid crystal display device using a liquid crystal composition containing impurities causes trouble such as short life, conventionally, sufficiently purified liquid crystal compositions are brought to market. Such liquid crystal compositions generally have a voltage-holding ratio of 90% or more and specific resistance of $10^{11}$–$10^{13}$ Ω·cm. To these liquid crystal compositions, a very small amount of at least one compound selected from the group consisting of condensed heterocyclic compounds, aromatic amine compounds, aliphatic amine compounds, and aromatic hydroxy compounds is added. As a result, the voltage-holding ratio can be easily controlled to scarcely lower the specific resistance value.

Compounds applicable to control the voltage-holding ratio of the liquid crystal compositions are condensed heterocyclic compounds, aromatic amine compounds, aliphatic amine compounds, and aromatic hydroxy compounds. As the condensed heterocyclic compounds, compounds having one or more hetero atoms of nitrogen, oxygen or sulfur are preferred. The following compounds are exemplified.

As bicyclic condensed heterocyclic compounds, benzofuran, benzothiophene, indole, isoindole, indolizine, quinoline, isoquinoline, quinolizine, isatin, coumarin, indazole, benzimidazole, quinazoline, quinoxaline, benzoxazole, benzothiazole, benzotriazole, benzoxadiazole, benzothiadiazole, and benzodioxane are exemplified.

As tricyclic condensed heterocyclic compounds, carbazole, dibenzothiophene, phenanthridine, dibenzofuran, acridine, phenazine, phenoxathiine, thianthrene and phenoxazine are exemplified.

In these bicyclic and tricyclic condensed heterocyclic compounds, benzothiophene, carbazole, dibenzothiophene, phenoxathiine, thianthrene and phenoxazine are preferred.

Compounds suited for controlling the voltage-holding ratio are aromatic amine compounds and aliphatic amine compounds. Preferably, these compounds are aromatic and aliphatic amine compounds represented by the general formula $R^4R^5R^6N$ wherein $R^4$, $R^5$ and $R^6$ are hydrogen, noncyclic alkyl, cyclic alkyl, aromatic hydrocarbon, substituted aromatic hydrocarbon, or heteromonocyclic groups. More preferably, these compounds are aromatic and aliphatic amine compounds represented by the general formula $R^1R^2R^3N$ wherein $R^1$ is hydrogen or phenyl, $R^2$ is hydrogen, noncyclic alkyl, cyclohexyl, benzyl, phenyl, tolyl, methoxyphenyl, 1-naphthyl or 2-naphthyl, and $R^3$ is cyclohexyl, phenethyl or phenyl, and the phenyl may be substituted by alkyl, alkoxyl, hydroxy, amino, nitro, nitroso, bromine, methylamino, cyclohexylamino, phenylamino, tolylamino, 1-naphthylamino, 2-naphthylamino or 4-phenylaminophenyl, and when $R^1$ is phenyl, $R^2$—N—$R^3$ may be piperazinyl.

As concrete aromatic amine compounds, 1,4-phenylenediamine, N-phenyl-1,4-phenylenediamine, N,N'-dimethyl-1,4-phenylenediamine, N-isopropyl-N'-phenyl-1,4-phenylenediamine, N,N'-ditolyl-1,4-phenylenediamine, N,N'-diphenyl-1,4-phenylenediamine, N,N'-bis(2-naphthyl)-1,4-phenylenediamine, 4-aminophenol, 4-methoxyaniline, N-phenyl-2-naphthylamine, N-phenyl-1-naphthylamine, N-4-methoxyphenyl-1,4 phenylenediamine, diphenylamine, tolylaniline, aniline, aminobiphenyl, 4-nitroaniline, 4-aminophenyl-4-methoxyphenylamine, N-cyclohexyl-N'-phenyl-1,4-phenylenediamine, N,N'-diphenylbenzidine, N-methylaniline, N-(4-nitrosophenyl) aniline, 2-aminophenol, 4-bromoaniline, 1,3-phenylenediamine, 3-methylaniline, phenylpiperazine, triphenylamine, N-phenylbenzylamine, N,N,N',N'-tetramethyl-1,4-phenylenediamine, and N,N'-dimethylindoaniline can be exemplified.

Triethylamine may be used as the aliphatic amine compounds, and compounds having a higher boiling point are preferred. In primary amines, cyclic alkyl amines are more preferred than noncyclic alkyl amines. Further, monocyclic compounds containing nitrogen may be used. Dicyclohexylamine, cyclohexylamine, N-propylphenethylamine, N-benzylphenethylamine and 4-phenylpiperidine are embodied.

Particularly preferable compounds in the aromatic and aliphatic amine compounds are N,N'-diphenyl-1,4-phenylenediamine, N,N'-bis(2-naphthyl)-1,4-phenylenediamine, diphenylamine, N,N'-diphenylbenzidine, N-benzylphenethylamine, phenylpiperazine, triphenylamine, N-phenylbenzylamine, N,N,N',N'-tetramethyl-1,4-phenylenediamine, and N,N-dimethylindoaniline.

In addition, compounds applicable to control the voltage-holding ratio of the liquid crystal compositions are aromatic hydroxy compounds. Preferably, the aromatic hydroxy compounds have electrophilic substituting groups on the aromatic rings and 10 or less of acidity constant Ka. These compounds contain cyanophenol derivatives, nitrophenol derivatives, halogenated phenol derivatives, and halogenated alkylphenol derivatives represented by the following general formula:

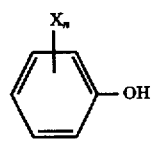

wherein X is cyano, nitro, halogen, haloalkyl, alkyl, aryl, or aralkyl; n is an integral number of 1–5.

As the aromatic hydroxy compounds, cyanophenol, nitrophenol, chlorophenol, bromophenol, fluorophenol, (trifluoromethyl)phenol, difluorophenol, dicyanophenol, methylfluorophenol, phenylfluorophenol, benzyl fluorophenol, (trifluoromethyl)fluorophenol, cyanofluorophenol, fluoronitrophenol, (trifluoromethyl) cyanophenol, chlorocyanophenol, and cyanodifluorophenol are exemplified.

In these aromatic hydroxy compounds, cyanophenol, difluorophenol, dicyanophenol, cyanofluorophenol, (trifluoromethyl) cyanophenol, and cyanodifluorophenol are particularly preferred.

As the liquid crystal compositions used in the present invention, mixtures of several kinds of liquid crystal compounds represented by the following structural formulae are exemplified.

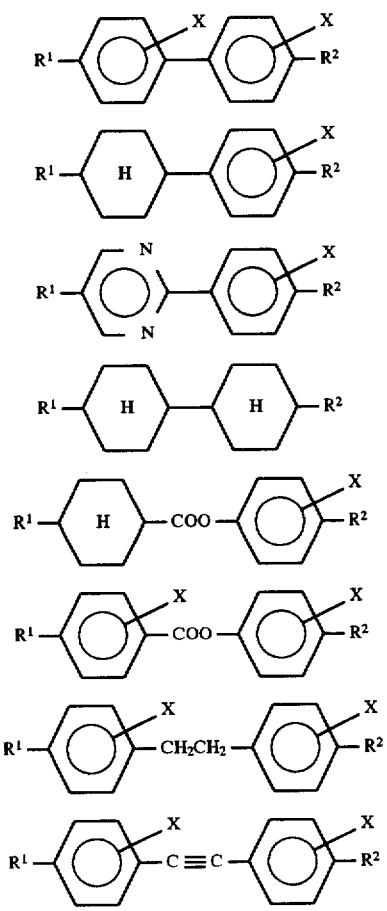

wherein $R^1$ and $R^2$ are alkyl, alkoxy alkyl, alkoxy, alkenyl, alkylphenyl, alkoxyalkylphenyl, alkoxyphenyl, alkenylphenyl, alkylcyclohexyl, alkoxyalkylcyclohexyl, alkenylcyclohexyl, cyanophenyl, cyano, halogens, trifluoromethyl, trifluoromethoxy or difluoromethoxy, and phenyl in $R^1$ and $R^2$ may be substituted by trifluoromethyl, trifluoromethoxy, difluoromethoxy, and halogens such as fluorine and chlorine. X shows hydrogen, trifluoromethyl, trifluoromethoxy, difluoromethoxy or a halogen such as fluorine and chlorine.

Appropriate upper limit value of the voltage-holding ratio of the liquid crystal compositions of the present invention is determined by existence of irregular display which was caused by irregular orientation of liquid crystal composition in the presence of dust and the like and by a fused phenomenon, and it is preferably 90% or less. Further, considering the influence of the consumption electric power and the reliability, the lower limit is preferably 40% or more. In addition, the voltage-holding ratio of the liquid crystal compositions is preferably 40% to 80%.

The content of at least one compound selected from the group of condensed heterocyclic compounds, aromatic amine compounds, aliphatic amine compounds and aromatic hydroxy compounds used in the present invention is such a very small amount that the stability such as a transition point to the isotropic state of the liquid crystal composition is not lost. The appropriate content is determined by preventing the precipitation and separation of the compound. Preferred content is 0.0001–3% by weight based on the liquid crystal composition. The voltage-holding ratio is dependent on the type and the content of the compound. Accordingly, by adding the compound having an appropriate very small amount of 0.0001–3% by weight to the composition, the voltage-holding ratio can be controlled to a desired value in the range of 40–80%.

In the liquid crystal compositions of the present invention, a mixture of two or more compounds selected from the group consisting of condensed heterocyclic compounds, aromatic amine compounds, aliphatic amine compounds, and aromatic hydroxy compounds may be used. Further, optically active materials such as cholesteril nonanoate may be used together with the compounds.

DESCRIPTION OF PREFERRED EMBODIMENTS

The following examples illustrate the present invention more specifically, but these will not always be precise in practical applications.

As the liquid crystal compositions, two kinds of liquid crystal mixtures (abbreviated as liquid crystal mixture 1 and liquid crystal mixture 2) having constituents of Table 1 containing a phenylcyclohexane type compound as a principal component are used. A liquid crystal cell is constituted as follows: a polyimide type resin (PSI-A-2204, manufactured by CHISSO CORPORATION) was applied to glass substrates and the resin was hardened. Coated surface of the substrates were rubbed. The liquid crystal cell was assembled by the glass substrates having transparent electrodes to obtain a cell gap of 6 m and twisted orientation of 240 degrees. The constituents of the liquid crystal mixtures are shown in Table 1.

TABLE 1

| Liquid crystal compounds | Liquid crystal mixture 1 (percentage by weight) | Liquid crystal mixture 2 (percentage by weight) |
|---|---|---|
|  | 12 | 12 |
| 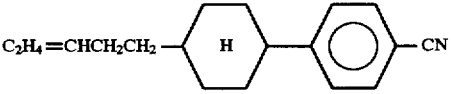 | 12 | 12 |
| 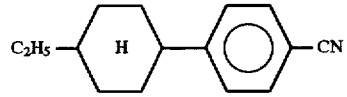 | 6 | 12 |
| 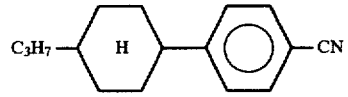 | 2 | 14 |
| 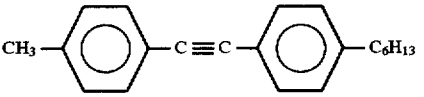 | 10 | 6 |
| 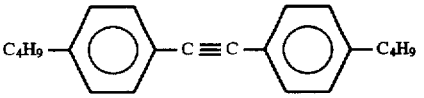 | 9 | 6 |

TABLE 1-continued

| Liquid crystal compounds | Liquid crystal mixture 1 (percentage by weight) | Liquid crystal mixture 2 (percentage by weight) |
| --- | --- | --- |
| C$_3$H$_7$–[H]–[⌬(F)]–C≡C–[⌬]–C$_2$H$_5$ | 3 | 4 |
| C$_3$H$_7$–[H]–[⌬(F)]–C≡C–[⌬]–C$_3$H$_7$ | 4 | 4 |
| C$_3$H$_7$–[H]–[H]–[⌬]–CH$_3$ | 8 | 8 |
| C$_3$H$_7$–[H]–[H]–[⌬]–OCH$_3$ | 4 | 4 |
| C$_3$H$_7$–[H]–[H]–[⌬]–C$_3$H$_7$ | 12 | 9 |
| C$_3$H$_7$–[H]–[H]–[⌬]–F | 4 | 4 |
| C$_2$H$_5$–[H]–[H]–[⌬]–CH$_3$ | 5 | 5 |
| C$_3$H$_7$–[H]–[⌬]–OC$_2$H$_5$ | 9 | — |
|  | 100 | 100 |

Figure 2:
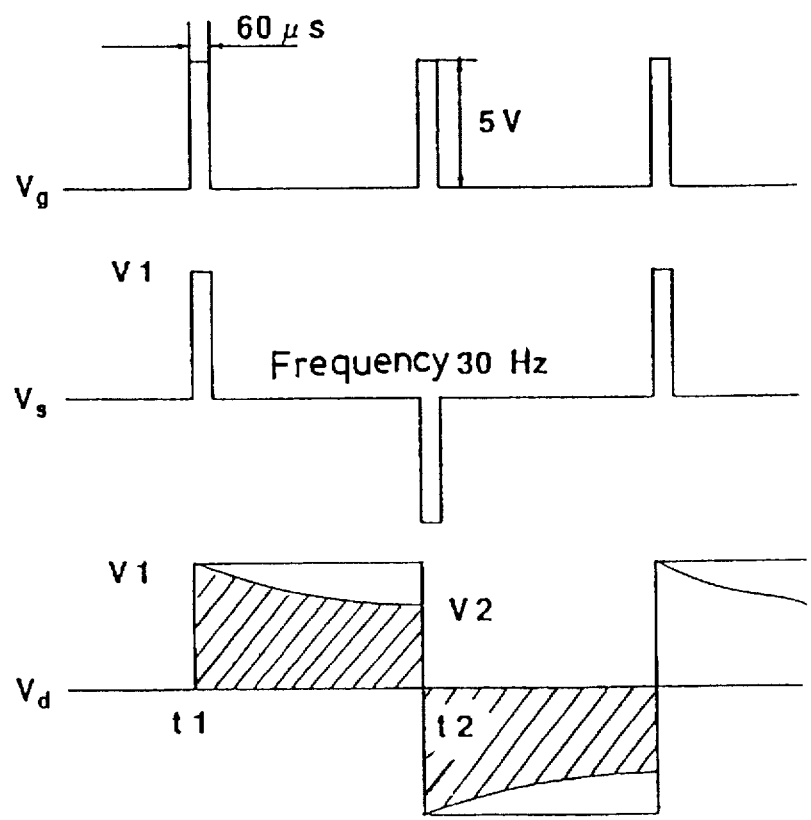
FIG. 2 shows driving waves and measuring waves in measurement of voltage-holding ratios.

The voltage-holding ratios of the liquid crystal compositions were determined by using the circuit shown in FIG. 1. FIG. 2 shows a waveform at measurement times, and the oblique line part of Vd is an embodied waveform measured in practice. The voltage-holding ratio is represented by the ratio of the area of the oblique line part ($v_1$-$t_1$-$t_2$-$v_2$) in FIG. 2 to the area of the product (($v_1$)×($t_1$-$t_2$)) of source voltage ($v_1$) and applied time ($t_1$-$t_2$).

EXAMPLE 1

To liquid crystal mixture 1, one percent by weight of dibenzothiophen of a tricyclic condensed heterocyclic compound was added and mixed well to prepare a liquid crystal composition. The voltage-holding ratio of the composition was 70% and the specific resistance value was 2×10$^{11}$ Ω·cm. Further, the voltage-holding ratio of liquid crystal mixture 1 was 95% and the specific resistance value was 5×10$^{12}$ Ω·cm. By using dibenzothiophen of a condensed heterocyclic compound, the specific resistance value was not appreciably lowered but the voltage-holding ratio could be lowered considerably.

EXAMPLE 2

To liquid crystal mixture 2, 0.03%, 0.3% and 1.0% by weight of phenoxazine of a tricyclic condensed heterocyclic compound were added, respectively, and liquid crystal compositions were prepared. The voltage-holding ratios of these compositions were 75%, 59% and 48%, respectively. The specific resistance values were 4×10$^{11}$ Ω·cm, 2×10$^{11}$ Ω·cm and 9×10$^{10}$ Ω·cm, respectively.

EXAMPLE 3

To liquid crystal mixture 2, 0.01 and 0.03% by weight of benzothiophene of a bicyclic condensed heterocyclic compound were added, respectively, and liquid crystal compositions were prepared. The voltage-holding ratios of these compositions were 60% and 51%, respectively. The specific resistance values of these compositions were 1×10$^{12}$ Ω·cm and 4×10$^{11}$ Ω·cm, respectively. Besides, the voltage-holding ratio of liquid crystal mixture 2 was 92%, and the specific resistance value was 3×10$^{12}$ Ω·cm. By using benzothiophene of a condensed heterocyclic compound, the specific resistance values were not appreciably lowered but the voltage-holding ratios could be lowered considerably.

EXAMPLE 4

To liquid crystal mixture 1, 0.3% and 1.0% by weight of carbazole of a tricyclic condensed heterocyclic compound were added, respectively, and liquid crystal compositions were prepared. The voltage-holding ratios of these compositions were 78% and 65%, respectively.

EXAMPLE 5

To liquid crystal mixture 2, 0.3% and 1.0% by weight of thianthrene of a tricyclic condensed heterocyclic compound were added, respectively, and liquid crystal compositions were prepared. The voltage-holding ratios of these compositions were 80% and 70%, respectively.

EXAMPLE 6

To liquid crystal mixture 1, 1.5% by weight of phenoxathiine was added, and liquid crystal composition was prepared. The voltage-holding ratio of the composition was 75%.

EXAMPLE 7 (Using Example)

A polyimide type resin (PSI-A-2204, manufactured by CHISSO CORPORATION) was coated on the surface of a pair of substrates having electrodes and the substrates were treated by rubbing to make twisted alignment of 240 degrees. Using this pair of substrates a liquid crystal cell having a cell gap of 6 μm was prepared with the pixels of 640×400 dots. The liquid crystal composition prepared by adding 0.03% by weight of benzothiophene to liquid crystal mixture 2 described in Example 3 was placed in the cell, and a STN device having two polarizer plates at the both sides was manufactured. A rectangular wave (ON voltage) of 20 V at 70 Hz was applied to the device so that a letter of "A" appeared. Uneven display was not observed. When the voltage was canceled after the application for one hour, a fused phenomenon was not observed under OFF conditions.

EXAMPLE 8

To liquid crystal mixture 1, 0.3% by weight of diphenylamine of an aromatic amine compound was added, and a liquid crystal composition was prepared. The voltage-holding ratio of the composition was 62% and the specific resistance value was $9\times10^{11}$ Ω·cm. Since the voltage-holding ratio of liquid crystal mixture 1 was 95% and the specific resistance value was $5\times10^{12}$ Ω·cm, by using diphenylamine of an amine compound, the specific resistance value was not appreciably lowered, whereas the voltage-holding ratio could be lowered considerably.

EXAMPLE 9

By adding 0.0005%, 0.003%, 0.03% and 0.3% by weight of N,N'-diphenylbenzidine of an aromatic amine compound to liquid crystal mixture 2, four liquid crystal compositions were prepared. The voltage-holding ratios of these compositions were 77%, 65%, 45% and 40%, respectively. On the other hand, the specific resistance values were $9\times10^{11}$ Ω·cm, $8\times10^{11}$ Ω·cm, $6\times10^{11}$ Ω·cm and $2\times10^{11}$ Ω·cm, respectively. Besides, the voltage-holding ratio of liquid crystal mixture 2 was 92%, and the specific resistance value was $3\times10^{12}$ Ω·cm. By using diphenylbenzidine of an amine compound, the specific resistance values were not appreciably lowered, whereas the voltage-holding ratios could be lowered considerably.

EXAMPLE 10

By adding 0.01%, 0.05%, 0.3% and 1% by weight of phenylpiperazine of an aromatic amine compound to liquid crystal mixture 2, four liquid crystal compositions were prepared. The voltage-holding ratios of these compositions were 78%, 69%, 60% and 42%. The specific resistance values were $3\times10^{11}$ Ω·cm, $1\times10^{11}$ Ω·cm, $8\times10^{10}$ Ω·cm and $7\times10^{10}$ Ω·cm, respectively.

EXAMPLE 11

By adding 0.005%, 0.03%, and 0.5% by weight of N-benzylphenethylamine of an aliphatic amine compound to liquid crystal mixture 1, three liquid crystal compositions were prepared. The voltage-holding ratios of these compositions were 73%, 64% and 58%, respectively.

EXAMPLE 12

By adding 2% by weight of triphenylamine of an aromatic amine compound to liquid crystal mixture 2, a liquid crystal composition was prepared. The voltage-holding ratio of the composition was 78%, and the specific resistance value was $8\times10^{10}$ Ω·cm.

EXAMPLE 13

By adding 0.3% by weight of N-phenylbenzylamine of an aromatic amine compound to liquid crystal mixture 2, a liquid crystal composition was prepared. The voltage-holding ratio of the composition was 76%, and the specific resistance value was $3\times10^{11}$ Ω·cm.

EXAMPLE 14

By adding 0.005%, 0.01%, and 0.5% by weight of N,N'-diphenyl-1,4-phenylenediamine of an aromatic amine compound to liquid crystal mixture 1, three liquid crystal compositions were prepared.

EXAMPLE 15

By adding 0.005%, 0.01% and 0.5% by weight of N,N'-bis(2-naphthyl)-1,4-phenylenediamine of an aromatic amine compound to liquid crystal mixture 1, three liquid crystal compositions were prepared.

EXAMPLE 16 (Using Example)

A polyimide type resin (PSI-A-2204, manufactured by CHISSO CORPORATION) was coated on the surface of a pair of substrates having electrodes, and the substrates were treated by rubbing to make twisted alignment of 240 degrees. Using these substrates a liquid crystal cell having a cell gap of 6 μm was prepared with the pixels of 640×400 dots. The liquid crystal composition prepared by adding 0.003% by weight of N,N'-diphenylbenzidine described in Example 9 to liquid crystal mixture 2 was injected in the cell, and a STN device having two polarizer plates at the both sides was manufactured. A rectangular wave (ON voltage) of 20 V at 70 Hz was applied to the device to appear a letter of "A". Uneven display was not observed. When the voltage was canceled after the application for one hour, a fused phenomenon was not observed under OFF conditions.

EXAMPLE 17

0.3% by weight of 2-fluoro-4-hydroxybezonitrile of an aromatic hydroxy compound was added to liquid crystal mixture 1 and mixed well to prepare a liquid crystal composition. The voltage-holding ratio of the composition was 65%, and the specific resistance value was $2 \times 10^{11}$ Ω·cm.

EXAMPLE 18

0.3% by weight of 3-fluoro-4-hydroxybezonitrile of an aromatic hydroxy compound was added to liquid crystal mixture 2 and mixed well to prepare a liquid crystal composition. The voltage-holding ratio of the composition was 70%, and the specific resistance value was $1 \times 10^{11}$ Ω·cm.

COMPARING EXAMPLE 1

Liquid crystal mixture 2 without an additive was sealed in the same cell as in Examples 7 and 16, and a STN device was manufactured. As described in these examples, after ON voltage was applied to the device for one hour so that a letter of "A" appeared, a fused phenomenon by which the letter of "A" remained faintly was observed under OFF conditions.

COMPARING EXAMPLE 2

A liquid crystal composition was prepared by adding 0.0001% by weight of tetrabutylammonium bromide of an ionic compound to liquid crystal mixture 2. The liquid crystal composition was injected in a liquid crystal cell having a cell gap of 6 μm and pixels of 640×400 dots which was prepared by coating a polyimide type resin (PSI-A-2204, manufactured by CHISSO CORPORATION) on the surface of electrodes and treated the coat by rubbing so as to make twisted alignment of 240 degrees. In this case, uneven display, it may be caused by adsorption of tetrabutylammonium bromide at injection, was observed near the inlet to the center of the cell.

As described above, condensed heterocyclic compounds, aromatic amine compounds and aliphatic amine compounds of the present invention are useful for widely improving irregular display or fusion phenomena of STN devices.

The present invention can provide liquid crystal compositions for liquid crystal display of a STN type that the voltage-holding ratio was controlled appropriately without lowering the specific resistance value. By the present invention, it becomes possible to provide liquid crystal devices of the STN type having high quality that no irregular display caused by dust and fusion phenomena are observed.

We claim:

1. A nematic liquid crystal composition for a liquid crystal display device of supertwisted nematic mode, which composition consists essentially of nematic liquid crystal and 0.0001–3% by weight of at least one compound selected from the group consisting of (1) condensed heterocyclic compounds, (2) aromatic amine compounds excluding aminophenol and methyl aminophenol compounds, (3) aliphatic amine compounds and (4) fluorocyanophenol compounds, based on the weight of the composition.

2. A liquid crystal composition as claimed in claim 1, wherein the condensed heterocyclic compounds have one or more hetero atoms of nitrogen, oxygen and sulfur.

3. A liquid crystal composition as claimed in claim 1, wherein the condensed heterocyclic compounds are selected from the group of benzofuran, benzothiophene, indole, isoindole, indolizine, quinoline, isoquinoline, quinolizine, isatin, coumarin, carbazole, dibenzothiophene, phenanthridine, dibenzofuran, indazole, benzimidazole, quinazoline, quinoxaline, benzoxazole, benzothiazole, benzotriazole, benzoxadiazole, benzothiadiazole, benzodioxane, acridine, phenazine, phenoxathiine, thianthrene and phenoxazine.

4. A liquid crystal composition as claimed in claim 1, wherein the condensed heterocyclic compounds are selected from the group of benzothiophene, carbazole, dibenzothiophene, phenoxathiine, thiantholene and phenoxazine.

5. A liquid crystal composition as claimed in claim 1, wherein the aromatic amine compounds and aliphatic amine compounds are represented by the general formula $R^1R^2R^3N$ wherein $R^1$ is hydrogen or phenyl, $R^2$ is hydrogen, noncyclic alkyl, cyclohexyl, benzyl, phenyl, tolyl, methoxyphenyl, 1-naphthyl or 2-naphthyl, and $R^3$ is cyclohexyl, phenethyl or phenyl, and the phenyl may be substituted by alkyl, alkoxyl, amino, nitro, nitroso, bromine, methylamino, cyclohexylamino, phenylamino, tolylamino, 1-naphthylamino, 2-naphthylamino or 4-phenylaminophenyl, and when $R^1$ is phenyl, $R^2$—N—$R^3$ may be piperazinyl.

6. A liquid crystal composition as claimed in claim 1, wherein the aromatic amine compounds and aliphatic amine compounds are selected from the group consisting of 1,4-phenylenediamine, N-phenyl-1,4-phenylenediamine, N,N'-dimethyl-1,4-phenylenediamine, N-isopropyl-N'-phenyl-1,4-phenylenediamine, N,N'-ditolyl-1,4-phenylenediamine, N,N'-diphenyl-1,4-phenylenediamine, N,N'-bis(2-naphthyl)-1,4-phenylenediamine, 4-methoxyaniline, N-phenyl-2-naphthylamine, N-phenyl-1-naphthylamine, N-4-methoxyphenyl-1,4-phenylenediamine, diphenylamine, tolylaniline, aniline, aminobiphenyl, 4-nitroaniline, 4-aminophenyl-4-methoxyphenylamine, N-cyclohexyl-N'-phenyl-1,4-phenylenediamine, N,N'-diphenylbenzidine, N-methylaniline, N-(4-nitrosophenyl) aniline, 4-bromoaniline, 1,3-phenylenediamine, 3-methylaniline, phenylpiperazine, triphenylamine, N-phenylbenzylamine, N,N,N',N'-tetramethyl-1,4-phenylenediamine, N,N-dimethylindoaniline, dicyclohexylamine, cyclohexylamine, N-propylphenethylamine, N-benzylphenethylamine, and 4-phenyl piperidine.

7. A liquid crystal composition as claimed in claim 1, wherein the aromatic amine compounds are selected from the group consisting of N,N'-diphenyl-1,4-phenylenediamine, N,N'-bis(2-naphthyl)-1,4-phenylenediamine, diphenylamine, N,N'-diphenylbenzidine, phenylpiperazine, triphenylamine, N-phenylbenzylamine, N,N,N',N'-tetramethyl-1,4-phenylenediamine, N,N-dimethylindoaniline and N-benzylphenethylamine.

8. A liquid crystal composition as claimed in claim 1 which has a voltage-holding ratio controlled in the range of 40–80%.

9. A liquid crystal display device of supertwisted nematic mode characterized in that the liquid crystal composition claimed in claim 1 is used.

10. A method for controlling a voltage-holding ratio of a liquid crystal composition for a display device of supertwisted nematic mode in the range of 40–80% by incorporating in the composition at least one compound selected from the group consisting of (1) condensed heterocyclic compounds, (2) aromatic amine compounds excluding aminophenol and methyl aminophenol compounds, (3) aliphatic amine compounds, and (4) fluorocyanophenol compounds.

* * * * *